United States Patent [19]

Nöethe

[11] 4,176,910
[45] Dec. 4, 1979

[54] OPTICAL RIBBON CABLES

[75] Inventor: Björn Nöethe, Ebersberg, Fed. Rep. of Germany

[73] Assignee: Siemens Aktiengesellschaft, Berlin & Munich, Fed. Rep. of Germany

[21] Appl. No.: 769,562

[22] Filed: Feb. 17, 1977

[30] Foreign Application Priority Data

Feb. 19, 1976 [DE] Fed. Rep. of Germany ....... 2606777

[51] Int. Cl.² .............................................. G02B 5/16
[52] U.S. Cl. ................................ 350/96.23; 350/96.24
[58] Field of Search ............. 350/96 R, 96 B, 96 BC; 427/385, 386, 163, 169

[56] References Cited

U.S. PATENT DOCUMENTS

| | | | |
|---|---|---|---|
| 3,050,907 | 8/1962 | Hicks, Jr. et al. ................ | 350/96 BC |
| 3,389,950 | 6/1968 | Harper ................................ | 350/96 B |
| 3,556,635 | 1/1971 | Schrenk et al. .................... | 350/96 B |
| 3,718,515 | 2/1973 | Goldstein .......................... | 350/96 B |
| 3,865,466 | 2/1975 | Slaughter .......................... | 350/96 B |
| 3,887,265 | 6/1975 | Margolis et al. ................... | 350/96 B |
| 3,980,390 | 9/1976 | Yamamoto ...................... | 350/96 B X |
| 4,000,936 | 1/1977 | Gloge ............................... | 350/96 B X |
| 4,037,923 | 7/1977 | Beal .................................. | 350/96 B |
| 4,072,400 | 2/1978 | Claypoole et al. ................ | 350/96.23 |

Primary Examiner—Rolf G. Hille
Attorney, Agent, or Firm—Hill, Van Santen, Steadman, Chiara & Simpson

[57] ABSTRACT

An optical ribbon or flat cable comprised of a plurality of elongated optically transmissive elements arranged parallel to one another and enveloped within a soft cast synthetic resin, such as an isocyanate, an epoxide, an unsaturated polyester, a silicone, an ethylene derivative, etc., which is chemically hardened or cured about the optical elements at a relatively low temperature.

9 Claims, 1 Drawing Figure

U.S. Patent
Dec. 4, 1979
4,176,910
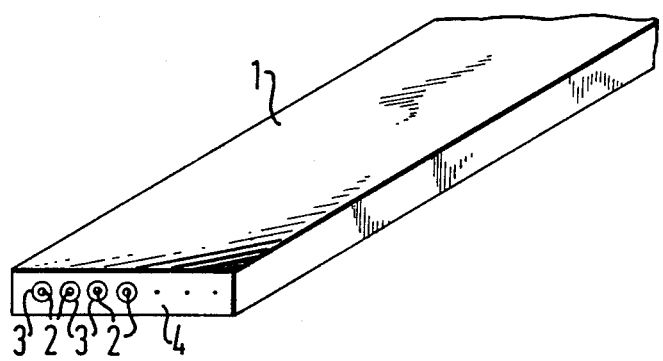

OPTICAL RIBBON CABLES

BACKGROUND OF THE INVENTION

1. Field of the Invention

The invention relates to optically transmissive elements and somewhat more particularly to optical ribbon cables or optical flat cables.

2. Prior Art

Electrical flat cables are known and have many advantages in a variety of applications. Typical prior art electrical flat cables or ribbon cables are produced, for example, by lamination, extrusion or calendering techniques or some other similar processes. While such methods are satisfactorily used in instances where such flat cables have metallic conductors therein, they are unsuitable when light conductors, such as optical fibers, are assembled into cables because the prior art production techniques produce mechanical stresses in the light conductors which adversely affect their light transmissive properties; for example, mechanical stresses on a light conductor may cause an increase of the transmission dampening within such a conductor. In addition, such production techniques are relatively rough and provide a relatively high incident of fiber breakage. Further, extruded members usually have orientation stresses, causing undesirable force influences on so-produced optical elements.

Optical cables which are embodied in the manner of electrical ribbon cables are known wherein a plurality of optical fibers are positioned next to one another in a parallel relation and are encased or enveloped between two interlaminated or interfused foils or sheets. The foils function as carriers for the optical fibers and can be further processed so as to form a cable in the form of an electrical ribbon cable. For example, such encased optical fibers can be positioned onto a cable core in an axially parallel relation, in a spiral relation, formed into a tube and placed onto a cable core or formed into a strand and positioned as a strand element in a body. Further details of this type of optical cable structure can be obtained from German Offenlegungsschrifts Nos. 2,314,313 or 2,424,041 or from U.S. Pat. No. 3,883,218.

SUMMARY OF THE INVENTION

The invention provides an improved optical ribbon cable having a plurality of optical elements therein so that such ribbon or flat cable is flexible and the danger of breaking or mechanically stressing the encapsuled optical elements is reduced to a minimum.

In accordance with the principles of the invention, optically transmissive elements are encased in a plastic material which is a soft cast synthetic resin. Such synthetic resins can be applied at relatively low processing temperatures and thereby avoid thermal and mechanical stresses on the optical elements. Soft cast synthetic resins are applied in an uncured state and chemically hardened in situ about the optical elements. Preferred soft synthetic resins used in the practice of the invention are selected from the group consisting of isocyanates, epoxides, unsaturated polyesters, silicones, ethylene derivatives and mixtures thereof. Soft synthetic resins may be formed into solid or foam-type bodies and may be filled with various coloring agents, such as dyes, pigments, etc., electrically conductive particles, electrical conductors as well as other elements for receiving mechanical forces. In addition, the optical elements may be coated with a lubricating and/or separating agent so as to be suspended thereby within the enveloping resin. In certain embodiments, such lubricating and separating agents comprise an optical immersion liquid which has an index of refraction substantially similar to that of the optical elements.

BRIEF DESCRIPTION OF THE DRAWING

The single FIGURE is a partial, somewhat perspective elevated end view of an optical ribbon cable constructed in accordance with the principles of the invention.

DESCRIPTION OF THE PREFERRED EMBODIMENTS

The invention provides an optical ribbon cable or optical flat cable wherein a plurality of optically transmissive elements are arranged parallelly to one another and enveloped within a soft cast synthetic resin so that such cable is mechanically stable and flexible and the danger of fiber breakage is kept to a minimum.

In accordance with the principles of the invention, the plastic material used to envelope optical elements is a soft cast synthetic resin. In developing the invention, the fact was considered that thermal stresses on glass fibers, produced, for example, during the extrusion of thermoplastic material, may cause an undesirable change in the optical and/or mechanical properties of the glass fibers. The use of cast resins as an envelope permits the use of relatively low processing temperatures (below about 100° C.). Accordingly, production of cables with such cast resins should be extremely gentle on the glass or optical fibers because thermal contractions and the like can hardly occur during a cooling process and mechanical stresses cannot occur. The formation of mechanical stresses and the danger of fiber breakage as well as an increase of transmission dampening caused in this manner are thus, to a great extent, avoided.

Soft cast resins (sometimes referred to as soft resins) are such resins which, in a cured or hardened state, are flexible and exhibit a rubber-like elasticity at least in layer thicknesses of up to a few millimeters. Soft cast resinse are therefore rubber-elastic case resins with Shore hardness A of 20 . . . 100 according to ASTM D 2240 which are cross-linked by chemical reaction. Soft resins useful in the practice of the invention are preferably selected from the group consisting of isocyanate resins, epoxy resins, unsaturated polyester resins, silicone resins, or ethylene derivative resins and mixtures thereof. Such soft resins are preferably formed into foam-type bodies containing the optical elements therein. Further, various coloring agents, conductive particles and other diverse filler materials may be incorporated within the soft resins in the practice of the invention.

In certain embodiments of the invention, lubricating and separating agents may be applied to the individual optically transmissive elements prior to application of a soft resin so that the optically transmissive elements (each being comprised of at least one optical fiber) are floatingly suspended or floatingly embedded within the soft resin envelope body. A mixture of silicone oil and a powder as for example talc, slate powder, mica powder, graphite powder, metal powder or powdery organic materials as for example starchflour, forms particularly useful separating and/or lubricating agents in the practice of the invention.

During the production of an optical ribbon cable, the optically transmissive elements are coated with a liquid film or a paste-like layer composed of a lubricating and/or a separating material which is relatively inert to the optical element and which adheres to the optical element during and after the application of the soft resins about the optical element in forming the optical ribbon cable. The lubricating and separating material used in the practice of the invention is selected from the group consisting of a silicone oil based on polymethylsiloxans or polymethylphenylsiloxans, a hydrocarbon boiling at relatively high temperatures, ester oils analagous to oils for machines or clocks or to softeners, talc, slate powder, mica powder, graphite powder, metal powder, powdered organic materials such as starch flour and mixtures thereof. Such lubricating or separating layer insures that a rigid adherence between the optical elements and a mechanically stable envelope does not occur so that mechanical stresses are further avoided. Further, such lubricating layer allows a length change due to temperature changes or mechanical stresses to occur within the cable with little, if any, resulting forces being transmitted to the optical elements so that undesirable effects, particularly undesirable dampening increases, are substantially avoided.

In other embodiments of the invention, the above described lubricating and separating agents, as for example, silicone oils on the base of polymethylsiloxans or polymethylphenysiloxans, hydrocarbons boiling at high temperatures or estor oils analogous to oils for machines or clocks or to softeners, are so-selected as to function as an optical immersion liquid. In these embodiments, a liquid material having an index of refraction substantially similar to that of at least a core portion of the optically transmissive elements is utilized. In the event of a break in one or more optical elements within a cable containing such a liquid material, a certain amount of this liquid material will infiltrate or seep into the gap produced by the breakage between portions of one or more optical elements so as to form an immersion fluid for the broken optical elements. In this manner, the light conductivity of a given optical transmission path is functionally maintained, even after a break occurs in an optical element.

In embodiments where separation agents are utilized in forming the ribbon or flat optical cables of the invention, the exposure of individual optical element ends (which are required for making steady for a special purpose, as for example fastening of connecting or coupling means) is substantially facilitated.

In certain embodiments, filler elements such as coloring agents, graphite powder, metal powder, etc. and/or electrical conductors as well as other elements which are capable of receiving mechanical forces may be embedded, along with the optically transmissive elements, within the envelope body comprised of a select soft cast resin.

Referring now to the drawing, an optical ribbon or flat cable 1 constructed in accordance with the principles of the invention is illustrated. As shown, the optical ribbon cable 1 contains a plurality of light transmissive elements 2 arranged parallelly to one another and encased in an outer cable body 4 composed of a soft resin. The envelope body 4 may comprise a solid body but preferably is a foam-type body. The light or optically transmissive elements 2 are each comprised of at least one optical fiber, which may, for example, be of the core-enveloped type known in the art. The optically transmissive elements 2 are uniformly coated with a lubricating and/or separating layer 3.

With the foregoing general discussion in mind, there is presented an illustrative example which will illustrate to those skilled in the art the manner in which the invention may be practiced. However, the example is not to be construed as limiting the scope of the invention in any way.

EXAMPLE

Select optically transmissive elements were suspended in a longitudinal container and positioned next to one another in a parallel relation. Then a solution of a paste-like or viscous silicone oil admixed with a solvent, as for example ethyl acetate, trichloroethylene or benzine, was applied onto the suspended optical elements and the solvent was allowed to evaporate. After evaporation of the solvent, the optical elements were encased with a thin layer of a soft case resin mixture having the following formulation:

An intermixture of 50 grams of aliphatic diisocyanate having an equivalent weight of 100 to 110 grams with 163 grams of an aliphatic polyol having an equivalent weight of 340 to 350 grams and 0.4 grams of dibutyl tin dilaurate.

After the foregoing resin mixture was applied onto the optical elements, the resin mixture was allowed to harden by chemical reaction and controlled heating of the resulting cable structure at about 60° to 80° C.

The above soft case resin mixture was replaced in other exemplary embodiments by the following resin mixtures and each provided a mechanically stable and flexible envelope body about the applied optically transmissive elements.

FORMULATION A

A soft case resin mixture was prepared by intermixing 50 grams of an aromatic diisocyanate having an equivalent weight of 130 to 140 grams, with 120 grams of an aliphatic polyol having an equivalent weight of 340 to 350 grams by a viscosity of 300 . . . 1500 m·Pa·s and 0.04 grams of dibutyl tin dilaurate.

FORMULATION B

A soft cast resin mixture was prepared by intermixing 50 grams of an aromatic diisocyanate having an equivalent weight of 130 to 140 grams with 105 grams of a glycerine-ricinoleic acid triester and 0.04 dibutyl tin dilaurate.

FORMULATION C

A soft cast resin mixture was prepared by intermixing 50 grams of diphenylmethane-4,4'-diisocyanate (having a purity of about 95%) with 140 to 150 grams pf polyether-polyester-polyol having an equivalent weight of 340 to 350 grams by a viscosity of 1500 . . . 2500 m·Pa·s and 0.1 gram of dibutyl tin dialuarate.

The above resin formulations were hardened about the optically transmissive elemtns by controllably heating the cable structure at a temperature of about 60° to 80° C.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

Concerning the soft cast resins there is an important fact that the material is liquid in state of casting at temperatures between 20° and 100° C. Thus the conductors can be embedded without pressure in a casting method. By a chemical reaction the material is crosslinked to a soft state like elastic rubber. This can be done by using components in the soft cast resin having a low concentration of reactive groups, as for example of groups of isocyanate or epoxy and further groups of hydroxyl, amino or carboxyl.

I claim as my invention:

1. An optical flat ribbon cable comprised of a plurality of optically transmissive glass fiber arranged parallel to one another and each having a layer of a separating and lubricating material thereon, said separating and lubricating material being selected from the group consisting of a silicone oil based on polymethylsiloxans or polymethylphenylsiloxans, a hydrocarbon boiling at relatively high temperatures, ester oils analagous to oils for machines or clocks or to softeners, talc, slate powder, mica powder, graphite powder, metal powder, powdered organic materials such as starch flour and mixtures thereof, said glass fibers each having a layer of said separating and lubricating material thereon being enveloped within an outer cable body comprised of a soft cast synthetic resin which is liquid in state during casting at temperatures between 20° and 100° C., and by chemical reaction is crosslinked into a soft solid state, like elastic rubber, by using components in the soft cast resin having a relatively low concentration of reactive groups, as for example, groups of isocyanate or epoxy and further groups of hydroxyl, amino or carboxyl, said layer of separating and lubricating material floatingly suspending said parallelly arranged glass fibers within said outer enveloping cable body composed of said soft cast synthetic resin.

2. An optical ribbon cable as defined in claim 1 wherein said body is a foam-type body.

3. An optical ribbon cable as defined in claim 1 wherein said soft cast synthetic resin is a material hardenable by chemical reaction at relatively low temperatures and is selected from the group consisting of isocyanates, epoxides, unsaturated polyesters, silicones, ethylene derivatives and mixtures thereto.

4. An optical ribbon cable as defined in claim 1 wherein said soft cast resin contains a filling agent therein.

5. An optical ribbon cable as defined in claim 4 wherein said filling agent is a dye.

6. An optical ribbon cable as defined in claim 4 wherein said filling agent is a pigment.

7. An optical ribbon cable as defined in claim 4 wherein said filling agent is a graphite powder.

8. An optical ribbon cable as defined in claim 4 wherein said filling agent is a metal powder.

9. An optical ribbon cable as defined in claim 1 wherein said separating and lubricating material comprises an immersion liquid having an index of refraction substantially similar to the index of refraction exhibited by at least a core portion of said optically transmissive element.

* * * * *